(12) United States Patent
Perez et al.

(10) Patent No.: US 9,274,594 B2
(45) Date of Patent: Mar. 1, 2016

(54) CLOUD-BASED PERSONAL TRAIT PROFILE DATA

(75) Inventors: Kathryn Stone Perez, Kirkland, WA (US); Alex Aben-Athar Kipman, Redmond, WA (US); John Clavin, Seattle, WA (US); Joseph Molnar, Belleveu, WA (US); Aaron E. Kornblum, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 12/789,768

(22) Filed: May 28, 2010

(65) Prior Publication Data

US 2011/0296505 A1 Dec. 1, 2011

(51) Int. Cl.
*G06F 3/01* (2006.01)
*G06F 21/32* (2013.01)
*G06F 21/34* (2013.01)

(52) U.S. Cl.
CPC ............ *G06F 3/011* (2013.01); *G06F 3/017* (2013.01); *G06F 21/32* (2013.01); *G06F 21/34* (2013.01)

(58) Field of Classification Search
CPC .......... G06F 3/017; G06F 21/32; G06F 21/34
USPC .......................................................... 726/6
See application file for complete search history.

(56) References Cited

U.S. PATENT DOCUMENTS

| | | | | |
|---|---|---|---|---|
| 5,600,781 A * | 2/1997 | Root | ............... | G06F 1/1616 345/472.3 |
| 5,710,884 A * | 1/1998 | Dedrick | ............... | H04L 29/06 709/217 |
| 6,072,494 A * | 6/2000 | Nguyen | ............... | G06F 3/017 345/156 |
| 6,405,318 B1 * | 6/2002 | Rowland | ............... | G06F 21/552 726/22 |
| 6,505,193 B1 * | 1/2003 | Musgrave | ............... | G06F 21/32 |
| 6,944,677 B1 | 9/2005 | Zhao | | |
| 6,948,136 B2 * | 9/2005 | Trewin | ............... | G06F 3/023 341/21 |
| 6,979,267 B2 | 12/2005 | Leen et al. | | |
| 7,089,499 B2 * | 8/2006 | Steichen | ............... | G06F 3/033 706/15 |

(Continued)

FOREIGN PATENT DOCUMENTS

| | | |
|---|---|---|
| JP | 2003-316746 A | 11/2003 |
| KR | 20100032699 | 3/2010 |

(Continued)

OTHER PUBLICATIONS

Fuzzy Rule-Based Hand Gesture Recognition; Benjamin Bedregal et al.; 2006, in IFIP International Federation for Information Processing, vol. 217, Artificial Intelligence in Theory and Practice, ed. M. Bramer, (Boston: Springer), pp. 285-294.*

(Continued)

*Primary Examiner* — James Turchen
(74) *Attorney, Agent, or Firm* — Micah Goldsmith; Judy Yee; Micky Minhas

(57) ABSTRACT

A system and method is disclosed for sensing, storing and using personal trait profile data. Once sensed and stored, this personal trait profile data may be used for a variety of purposes. In one example, a user's personal trait profile data may be accessed and downloaded to different computing systems with which a user may interact so that the different systems may be instantly tuned to the user's personal traits and manner of interaction. In a further example, a user's personal trait profile data may also be used for authentication purposes.

10 Claims, 10 Drawing Sheets

(56) References Cited

U.S. PATENT DOCUMENTS

| | | | |
|---|---|---|---|
| 7,099,825 B1* | 8/2006 | Cook | 379/202.01 |
| 7,190,356 B2* | 3/2007 | Lin | G06F 3/0416 345/156 |
| 7,373,516 B2* | 5/2008 | Ashok | G06F 21/31 713/183 |
| 7,437,457 B1* | 10/2008 | Eisendrath | H04L 63/10 709/204 |
| 7,453,355 B2* | 11/2008 | Bergstrom | G01S 5/0018 340/539.13 |
| 7,487,461 B2* | 2/2009 | Zhai | G06F 3/04883 345/168 |
| 7,510,474 B2 | 3/2009 | Carter, Sr. | |
| 7,534,169 B2 | 5/2009 | Amaitis et al. | |
| 7,664,961 B2* | 2/2010 | Blattner | G06F 3/03543 713/182 |
| 7,760,182 B2* | 7/2010 | Ahmad | G06Q 30/00 345/156 |
| 7,774,842 B2* | 8/2010 | Mahone | H04M 15/00 379/114.14 |
| 7,850,526 B2* | 12/2010 | Zalewski | A63F 13/00 463/36 |
| 8,151,107 B2* | 4/2012 | Song | G06Q 20/367 705/65 |
| 8,325,214 B2* | 12/2012 | Hildreth | H04N 7/147 348/14.03 |
| 8,345,866 B2* | 1/2013 | Drader | G09C 5/00 380/44 |
| 8,353,764 B2* | 1/2013 | Williams | G06F 21/36 463/16 |
| 8,390,579 B2* | 3/2013 | Petit | G06F 3/04883 345/173 |
| 8,539,357 B2* | 9/2013 | Hildreth | G06K 9/00335 715/733 |
| 8,565,535 B2* | 10/2013 | Shamaie | G06F 3/017 382/187 |
| 8,631,355 B2* | 1/2014 | Murillo | A63F 13/06 715/863 |
| 8,819,596 B2* | 8/2014 | Kela | G06F 1/1626 715/863 |
| 2005/0004873 A1* | 1/2005 | Pou | G06F 21/10 705/51 |
| 2005/0264398 A1* | 12/2005 | Siegel | G07C 9/00087 340/5.52 |
| 2006/0048236 A1* | 3/2006 | Multerer | G06F 21/121 726/28 |
| 2006/0191995 A1* | 8/2006 | Stewart | G06F 21/6245 235/379 |
| 2007/0173326 A1 | 7/2007 | Jennings et al. | |
| 2008/0120698 A1* | 5/2008 | Ramia | H04L 63/08 726/4 |
| 2008/0129694 A1* | 6/2008 | Haven | G06F 3/014 345/158 |
| 2008/0214310 A1 | 9/2008 | Brunet De Courssou et al. | |
| 2009/0006846 A1* | 1/2009 | Rosenblatt | H04W 12/08 713/159 |
| 2009/0088142 A1 | 4/2009 | Baribault et al. | |
| 2009/0215533 A1* | 8/2009 | Zalewski | A63F 13/00 463/32 |
| 2009/0216775 A1* | 8/2009 | Ratliff | G06Q 10/08 |
| 2009/0221368 A1* | 9/2009 | Yen | A63F 13/10 463/32 |
| 2009/0327314 A1 | 12/2009 | Kim et al. | |
| 2010/0009756 A1* | 1/2010 | Burckart | G07F 17/32 463/40 |
| 2010/0095250 A1* | 4/2010 | Roberto | H04L 67/36 715/863 |
| 2010/0151946 A1* | 6/2010 | Wilson | G06F 3/017 463/36 |
| 2010/0231512 A1* | 9/2010 | Perez | A63F 13/10 345/158 |
| 2011/0107216 A1* | 5/2011 | Bi | G06F 3/011 715/716 |
| 2013/0190089 A1* | 7/2013 | Wilson | G06F 3/017 463/36 |

FOREIGN PATENT DOCUMENTS

| | | |
|---|---|---|
| KR | 101017936 B1 | 3/2011 |
| WO | 03053060 | 6/2003 |
| WO | 2008/103991 A2 | 8/2008 |
| WO | 2009142624 A1 | 11/2009 |

OTHER PUBLICATIONS

"Gaming Center, Internet Cafe and Cyber Cafe Software", Antamedia Internet Cafe Software, website, retrieved Mar. 29, 2010, http://www.antamediacafe.com/gaming-center-software/.

Pellerin, "Player Profile Management on NFC Smart Card for Multiplayer Ubiquitous Games", International Journal of Computer Games Technology, Jul. 14, 2009, 9 pages, Hindawi Publishing Corporation.

Supplementary European Search Report dated Apr. 29, 2013 in European Patent Application No. 11787248.1.

Response to Official Communication filed Aug. 28, 2013 in European Patent Application No. 11787248.1.

Response to Office Action filed Jan. 5, 2015, and partial English translation thereof, in Chinese Patent Application No. 201180026263.9.

Office Action dated in Aug. 21, 2014 in Chinese Patent Application No. 201180026264.9.

"Office Action Received in Japan Patent Application No. 2013-513218", Mailed Date: May 1, 2015, 6 pages.

Response to Office Action filed Jul. 14, 2015, and partial English translation thereof, in Chinese Patent Application No. 201180026264.9.

Office action dated Apr. 27, 2015 in Japanese Patent Application No. 2013-513218.

"Second Office Action and Search Report Issued in Chinese Patent Application No. 201180026264.9", Mailed Date: Apr. 29, 2015, 13 Pages.

* cited by examiner

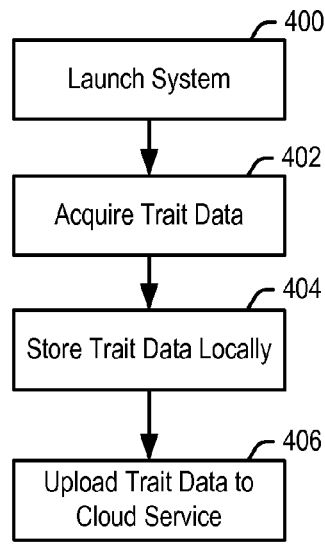
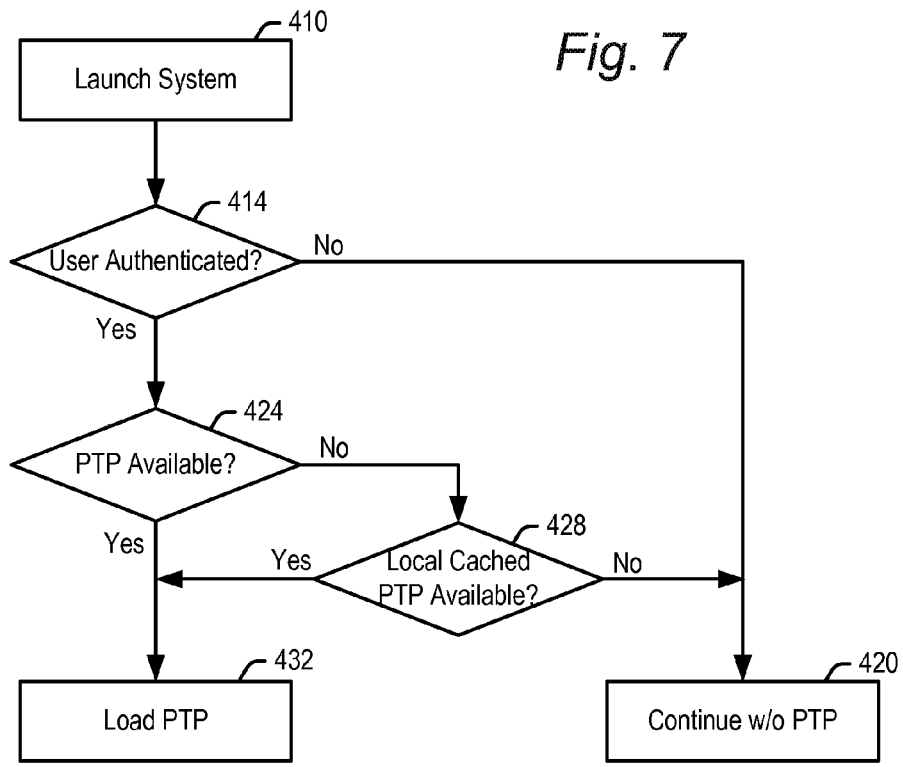

CLOUD-BASED PERSONAL TRAIT PROFILE DATA

BACKGROUND

In the past, computing applications such as computer games and multimedia applications used controllers, remotes, keyboards, mice, or the like to allow users to manipulate game characters or other aspects of an application. More recently, computer games and multimedia applications have begun employing cameras and software gesture recognition engines to provide a natural user interface ("NUT"). With NUI, user gestures are detected, interpreted and used to control game characters or other aspects of an application.

Mice and other such controllers provide a well-defined interface for interacting with computing systems. One of the challenges of NUI systems is that the interface is controlled by a user's interaction with, and perception of, the 3-D space in which they move. However, physical, societal and other personal traits make each user at least slightly different, and as such, different users interact with NUI systems in different ways. Thus, for example, where a user's performance of a gesture varies from the norm, the NUI system may not understand the user's intention. While a user's own NUI system can be tuned over time to their personal style of interaction, the user may have trouble interacting with NUI systems other than their own.

Despite presenting difficulties for a NUI system, a user's personal traits have potential benefits which at present are not being taken advantage of. For example, current systems go to lengths to ensure proper authentication of users through login protocols and passwords, but do not use the wealth of information provided by a user's personal traits for authentication purposes.

SUMMARY

Disclosed herein is a system for generating, storing and using a personal trait profile associated with a user. The personal trait profile may be generated by a first computing environment, and then stored at a central database accessible by a plurality of computing environments including the first computing environment. The personal trait profile may contain data relating to personal traits of a user that may be sensed by a capture device associated with the first computing device. These personal traits include, but are not limited to, physical characteristics of the user such as size, shape and hair; voice characteristics such as accent, pitch, tenor and cadence; and gestures that the user performs in an atypical manner.

Once generated and stored, a user's personal trait profile data may be used for a variety of purposes. In one example, a user's personal trait profile data may be accessed and downloaded to different computing systems with which a user may interact so that the different systems may be instantly tuned to the user's personal traits and manner of interaction. In a further example, a user's personal trait profile data may also be used for authentication purposes.

In one embodiment, the current technology relates to a method of improving a user experience with natural user interface systems. The method includes the steps of: a) acquiring data representing a trait of a user from a sensor of a natural user interface associated with a first computing environment; b) storing the trait data acquired in said step a) in a location accessible to a second computing environment distinct from the first computing environment; and c) providing the trait data stored in said step b) to the second computing environment.

In a further embodiment, the current technology relates to a method of improving a user experience in a system comprising a plurality of computing environments, a first computing environment coupled to a capture device for capturing traits of a user. The method includes the steps of: a) generating a personal trait profile for a user from data representing one or more traits of the user received from the capture device; b) storing the personal trait profile generated in said step a) in a location accessible to a second computing environment distinct from the first computing environment; and c) providing the personal trait profile stored in said step b) to the second computing environment upon access of the second computing environment by the user.

In a further embodiment, the current technology relates to a method of improving a user experience with the natural user interface in a system comprising one or more computing environments for gaming applications and a capture device for providing a natural user interface. The method includes the steps of: a) generating a personal trait profile for a user from data representing one or more traits of the user acquired from a capture device associated with a computing environment; b) storing the personal trait profile acquired in said step a); c) receiving a request for access to resources in a location storing the trait data stored in said step b); d) acquiring data representing one or more traits stored in the personal trait profile after said step c) of receiving the request for access to resources; e) comparing the data acquired in said step d) against the data stored in the personal trait profile; and f) granting the request for access to the resources if the comparison of said step e) shows a match between the data acquired in said step d) and the data stored in the personal trait profile.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a flowchart showing the generation and storage of a personal trait profile.

FIG. 7 is a flowchart showing the accessing of a personal trait profile.

DETAILED DESCRIPTION

Embodiments of the present technology will now be described with reference to FIGS. 1-10, which in general relate to a system for generating, storing and using a personal trait profile associated with a given user. Once generated and stored, a user's personal trait profile data may be used for a variety of purposes. In one example, a user's personal trait profile data may be accessed and downloaded to different computing systems with which a user may interact so that the different systems may be instantly tuned to the user's personal traits and manner of interaction. In a further example, a user's personal trait profile data may also be used for authentication purposes.

Figure 1A:
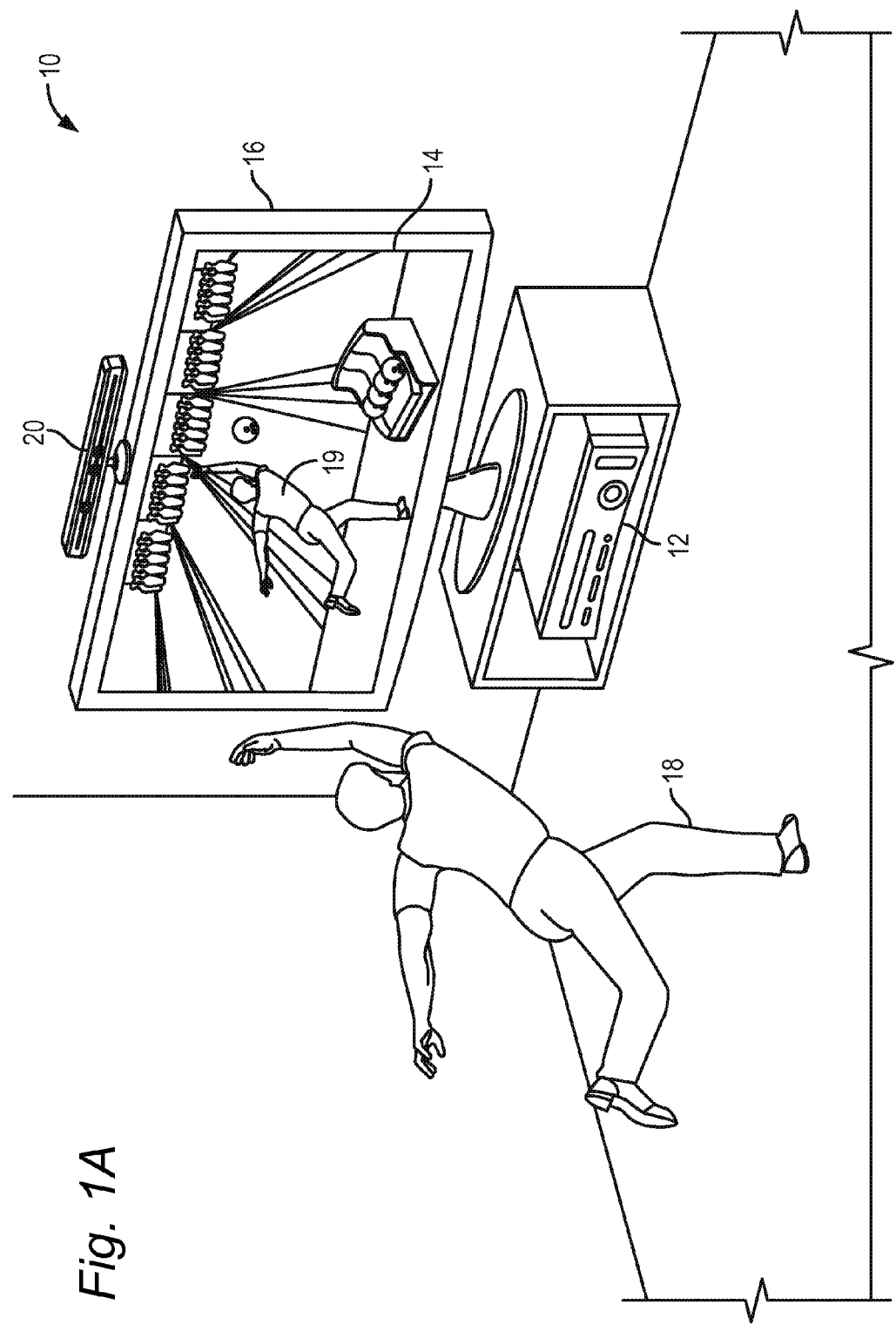
FIG. 1A illustrates an example embodiment of a target recognition, analysis, and tracking system with a user participating in a game.
Figure 1B:
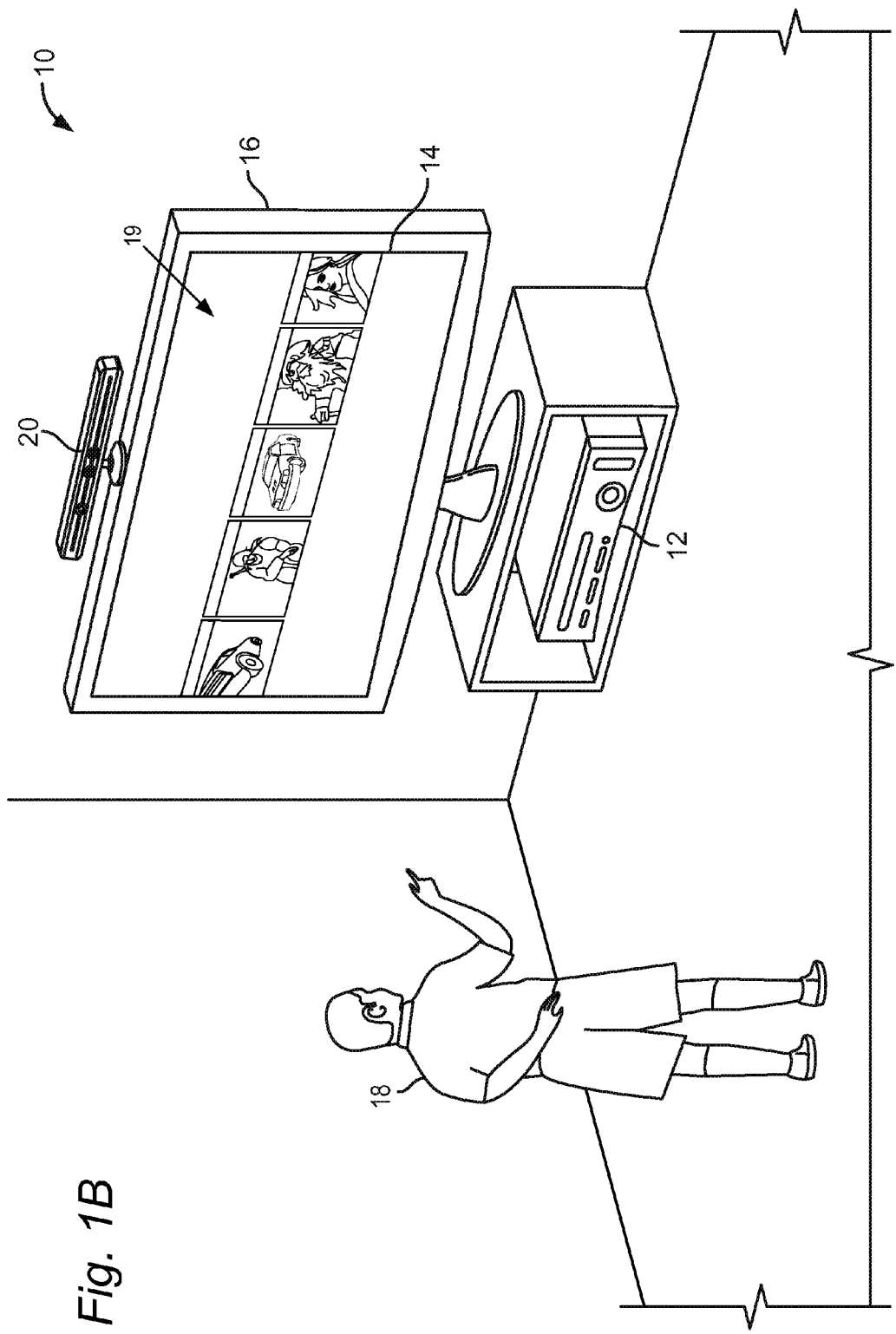
FIG. 1B illustrates a further example embodiment of a target recognition, analysis, and tracking system with a user operating a graphical user interface.
Figure 2:
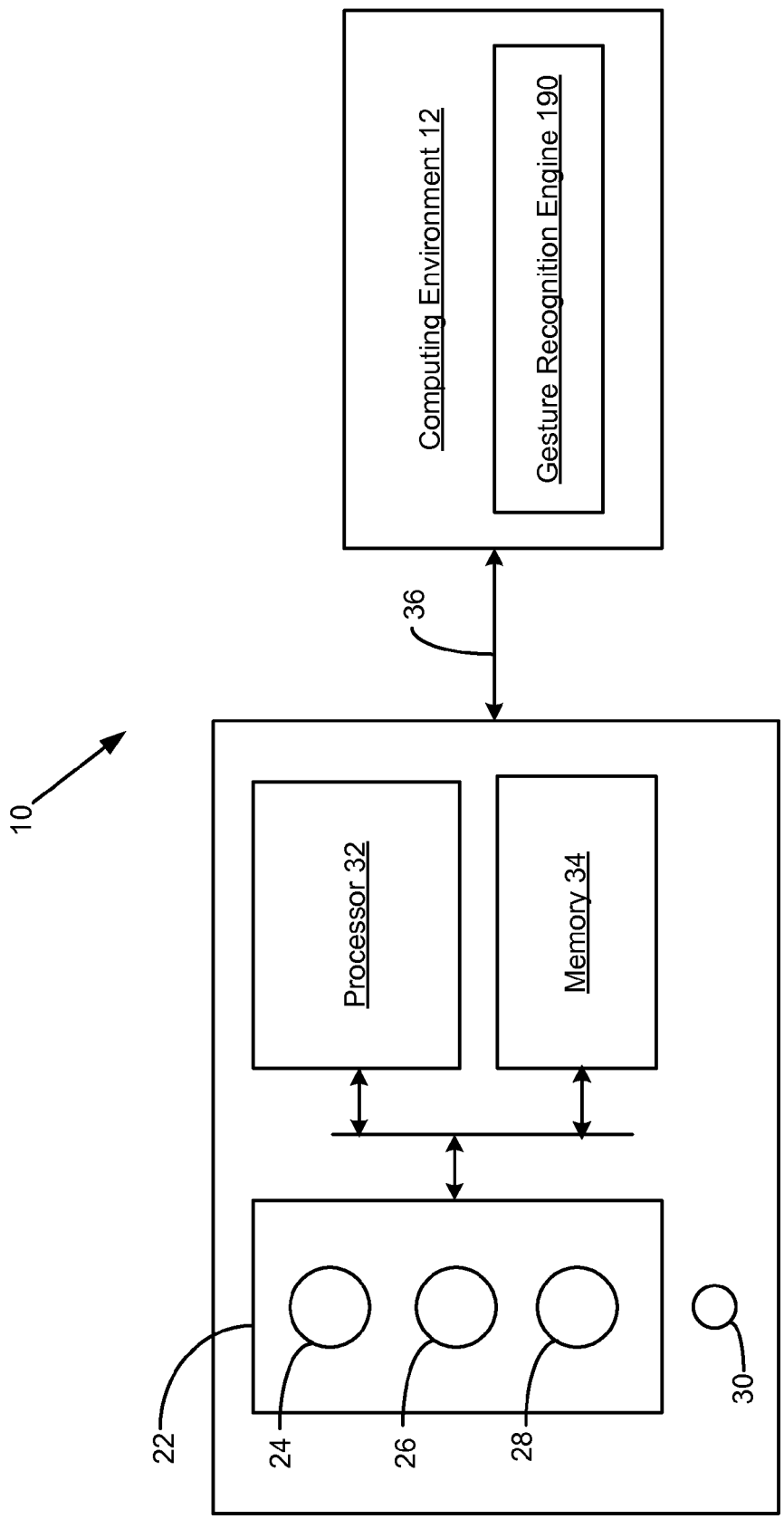
FIG. 2 illustrates an example embodiment of a capture device that may be used in a target recognition, analysis, and tracking system.

Referring initially to FIGS. 1-2, the hardware for implementing the present technology includes a target recognition, analysis, and tracking system 10 which may be a NUI system used to recognize, analyze, and/or track a human target such as the user 18. Embodiments of the target recognition, analysis, and tracking system 10 include a computing environment 12 for executing a gaming or other application, and an audiovisual device 16 having a display 14 for providing audio and visual representations from the gaming or other application. The system 10 further includes a capture device 20 for detecting position and movement of a user captured by the device 20, which the computing environment receives and uses to control the application. Each of these components is explained in greater detail below.

As shown in FIG. 1A, in an example embodiment, the application executing on the computing environment 12 may be a bowling game that the user 18 may be playing. For example, the computing environment 12 may use the audiovisual display 14 to provide a visual representation of a bowling alley to the user 18. The computing environment 12 may also use the display 14 to provide a visual representation of a player avatar 24 that the user 18 may control with his or her movements. For example, the user 18 may move and swing their arm to simulate bowling a bowling ball in physical space, and this motion is mimicked by the avatar 24 to bowl a virtual ball down the virtual bowling lane. Thus, according to an example embodiment, the computer environment 12 and the capture device 20 of the target recognition, analysis, and tracking system 10 may be used to recognize and analyze the user's approach and arm swing in physical space so as to be interpreted as a game control of the player avatar 24 in game space.

A bowling application is one of any number of applications for the NUI system 10 where a user's motion and/or position are interpreted by the computing environment as a predefined gesture for controlling some feature of the application. The system 10 may also have a wide variety of predefined gestures used as system controls which are not unique to a particular application. For example, FIG. 1B shows a user interacting with a graphical user interface 19 displayed on display 14. The interface 19 is a menu driven display, which the user is able to scroll through using predefined gestures.

FIG. 2 illustrates an example embodiment of the capture device 20 that may be used in the target recognition, analysis, and tracking system 10. Further details relating to a capture device for use with the present technology are set forth in copending patent application Ser. No. 12/475,308, entitled "Device For Identifying And Tracking Multiple Humans Over Time," which application is incorporated herein by reference in its entirety. However, in an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

According to another embodiment, the capture device 20 may include two or more physically separated cameras that may view a scene from different angles, to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12. The capture device 20 may further include a variety of other sensors for sensing traits of a user in further embodiments.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person.

The skeletal model may then be provided to the computing environment 12 such that the computing environment may perform a variety of actions. The computing environment may track the skeletal model and render an avatar associated with the skeletal model on an audiovisual display 14. The computing environment may further determine which controls to perform in an application executing on the computer environment based on, for example, gestures of the user that have been recognized from the skeletal model. For example, as shown, in FIG. 2, the computing environment 12 may include a gesture recognizer engine 190 for determining when the user has performed a predefined gesture. Gesture recognizer engine 190 is explained in greater detail hereinafter.

Figure 3:
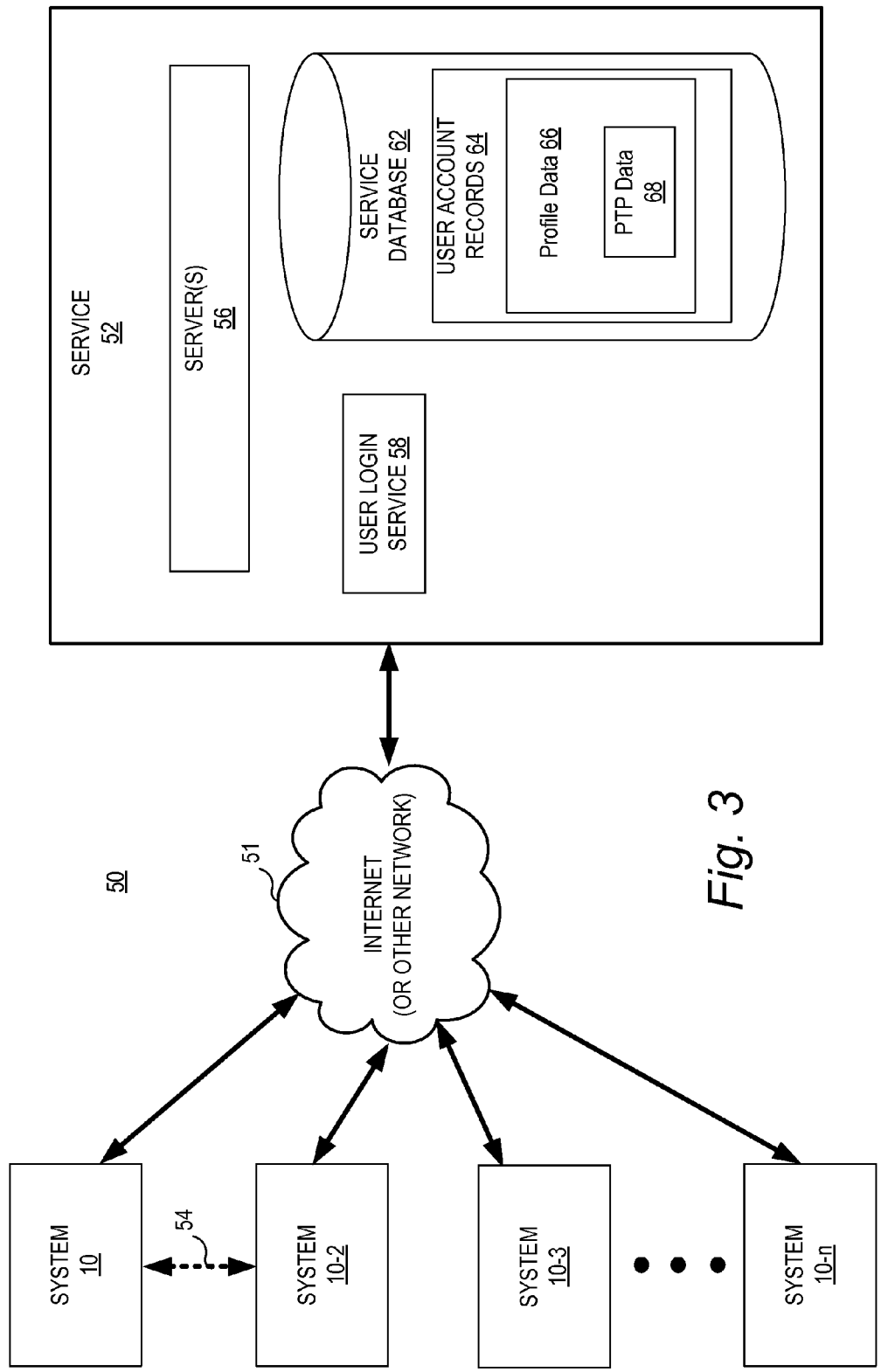
FIG. 3 illustrates a network topology for implementing embodiments of the present technology.

Data and other information obtained by the system 10 may be shared with one or more other systems and servers, such as for example via a network topology 50 shown in FIG. 3. FIG. 3 shows system 10 described above (referred to in FIG. 3 as system 10-1), as well as a variety of other systems 10-2, 10-3, . . . , 10-n, each of which may include some or all of the components described above with respect to system 10. Each of the systems 10-1 through 10-n (collectively referred to as systems 10) may be connected to a central service 52 via a network 51. As explained in greater detail below, personal trait profile data may be collected for a user on any of the systems 10 and stored in a service database 62 of service 52.

The computing environments 12 on each of the systems 10 may be the same or different computing environment, and may for example be a multimedia console, a personal computer (PC), a gaming system or console, a server, a handheld computing device, a PDA, a mobile phone, a cloud computer, or the like. The systems 10 may be networked to each other and service 52 via network 51.

Network 51 may by the Internet, but may in general include for example an intranet, a personal area network (PAN), a campus area network (CAN), a local area network (LAN), a wide area network (WAN), a computer network, a gaming network, or the like. The topology 50 may utilize a network infrastructure such as client/server, peer-to-peer (as indicated by dashed arrow 54), or hybrid architectures.

The network 51 may also represent the technology that connects individual devices in the network, such as optical fibre, a public switched telephone network (PSTN), a cellular telephone network, a global Telex network, wireless LAN, Ethernet, power line communications, or the like. Computing environments may be connected together by wired or wireless systems, by local networks or widely distributed networks. Any appropriate wireless interface can be utilized for network communications. For example, the wireless link can be in accordance with the following protocols: GSM, CDMA, UMTS, LTE, WIMAX, WIFI, ZIGBEE, or a combination thereof. A network may include cloud or cloud computing. A cloud infrastructure, for example, may include a multitude of services delivered through data centers and built on servers. The services may be accessible anywhere that provides access to the networking infrastructure. The cloud may appear to be a single point of access to the user and the infrastructure may not be visible to a client.

The service 52 may include, in part, one or more servers 56, a login service 58 and a database 62, also referred to herein as a central database. In embodiments, the service 52 may be the Xbox LIVE® gaming and media delivery service operated by Microsoft Corporation, though it may be other services in further embodiments. The servers 56 may include web servers and/or servers for hosting gaming or other applications to be played by users of systems 10. The applications may alternatively be resident on the computing environments associated with the various systems 10. Users of systems 10 may gain access to their account records 62 via user login service 58, which is used to authenticate a user on a system 10. In one example, during login, login service 58 obtains a gamer tag (a unique identifier associated with the user) and a password from the user, as well as a computing environment ID that uniquely identifies the system that the user is using. The gamer tag and password are authenticated by comparing them to user account records 64 in a database 62. The database 62 may be located on the same server as user login service 58 or may be distributed on a different server or a collection of different servers. It is understood that the above-described authentication process may vary in alternative embodiments. Any of a variety of authentication schemes may be employed to identify a user so that he or she may connect to service 52 and access their user account records 64.

User account records 64 may include additional information about a user, such as game records, statistics and achievements. User records may also include user profile data 66, which may include a variety of information including contact and other descriptive information as well as a friends list. In accordance with the present technology, the profile data 66 may further store personal trait profile data 68 as explained below.

The respective computing environments 12 on systems 10 may execute their own applications, but are also able to access other computing environments on systems 10, as well as applications executing on, or devices connected to, other computing environments, anywhere on the network 51. Thus, a user of one computing environment 12 on a first system, e.g., system 10-1, may use the network to share data (e.g., files, databases), interact with other applications, share devices (e.g., printers), communicate with other users (e.g., email, chat), etc. on one or more other systems 10. Any number of users associated with any number of respective local computing environments may access the same application via the network 51.

One item of data which may be generated by, and shared between, different systems 10 is a personal trait profile 68 (abbreviated herein as PTP 68 hereinafter). The PTP 68 is shown stored in database 62 on service 52, but cached versions of PTP 68 may also be stored on respective systems 10. The generation and composition of PTP 68 is explained below, but may in general include any trait associated with a given user which can be sensed by a sensor associated with a given system 10. Different systems 10 may have different sensors.

The network topology 50 enables any computing environment that has access to the network to access the PTP 68 from service 52 or from the computing environment on another system 10. Thus, a user 18 may generate data on a first system, e.g., system 10-1, which is included in the PTP 68 and uploaded to database 62 on service 52. Thereafter, the user may move to a different location, or use a different computing environment in the same location, and download the PTP 68 to that computing environment. Thus, according to one example of the present technology, a user may travel from his or her home system to a friend's house, or any other computing environment associated with network 51, and have access to their PTP 68. This feature of the present technology is explained in greater detail hereinafter.

A computing environment that generates or accesses a PTP 68 may also have associated metadata relating to the computing environment properties and specifications. For example, a computing environment may store RGB capabilities, screen size, available input devices, the range of the capture device, the components of the computing environment (e.g., audio/video capabilities), structure information, etc. The computing environment may use such information to modify the integration of the PTP 68 with the system and/or default gesture information. For example, a gesture may be defined by movement in the physical space that corresponds to movement from a top of a display portion of the display device to a bottom of the display portion of the display device. The user's PTP 68 may have been generated by a computing environment with a 60 inch display device and comprise a distance between the top and bottom of the display portion that corresponds to the distance on the 60 inch display device. On another computing environment, such as one with a 25 inch display device, the system may identify the smaller distance between the top and bottom of the screen such that the distance for recognizing the gesture corresponds to the smaller screen size. Similarly, if the physical room has a certain size, the computing environment may include the size in the analysis or modification of the integration of a gesture profile with the system and/or default gesture information. For example, if the user stands closer to the screen, the interpretation of the user's gestures may be considered in light of the size of the room.

In another example, the metadata may include information specific to the file structure of the local computing environment. For example, a first computing environment may run programs, load a gesture profile, or store the gesture profile in a particular location of the computing environment's hard drive, and a second computing environment may use a different location. Also, a computing environment having rich browsing capabilities may have the ability to do more with the PTP 68 data than, for example, a mobile phone. The metadata stored in association with the PTP 68 data adopts and optimizes the PTP data for a particular device.

Figure 4A:
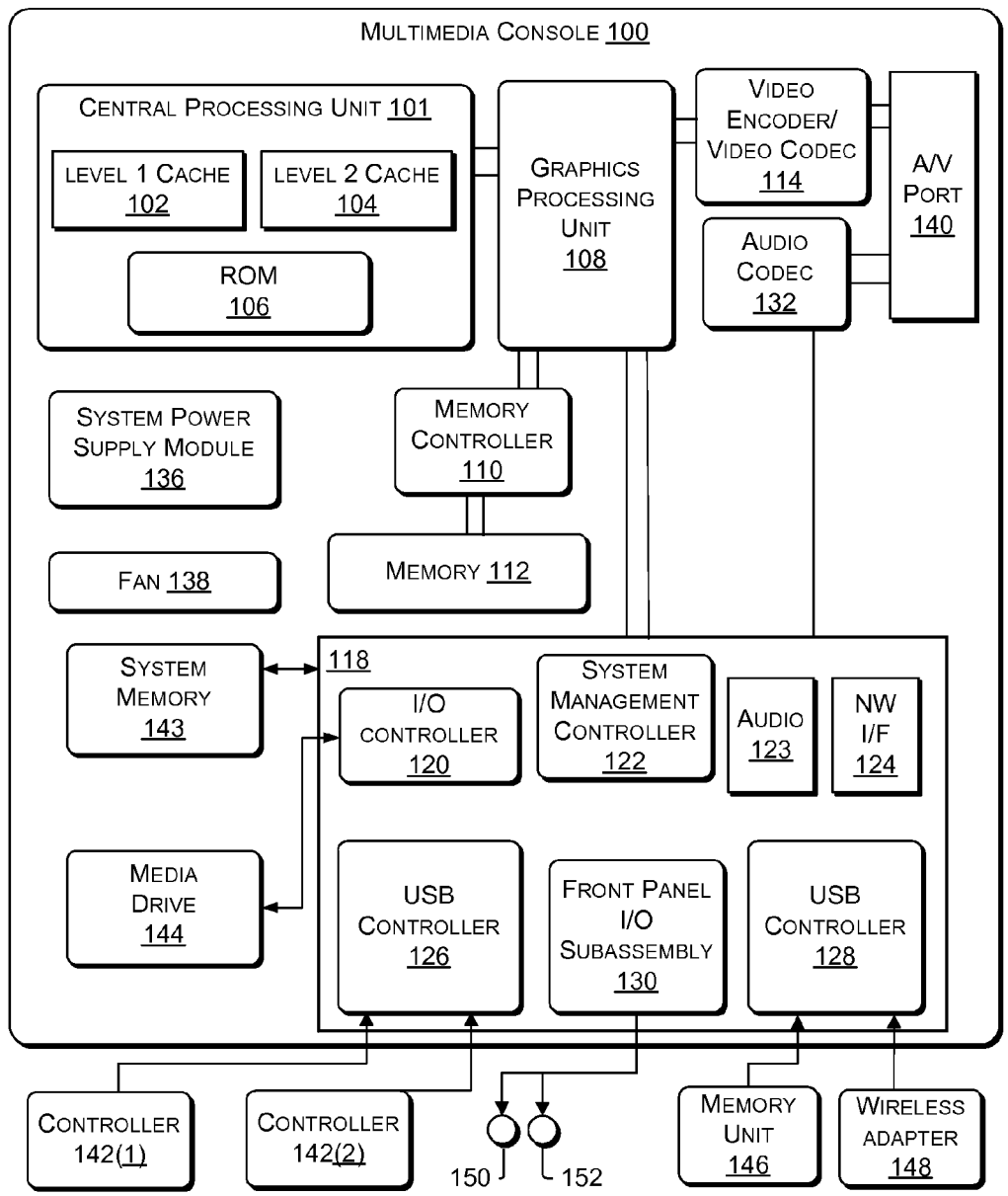
FIG. 4A illustrates an example embodiment of a computing environment that may be used to interpret one or more gestures in a target recognition, analysis, and tracking system.
Figure 4B:
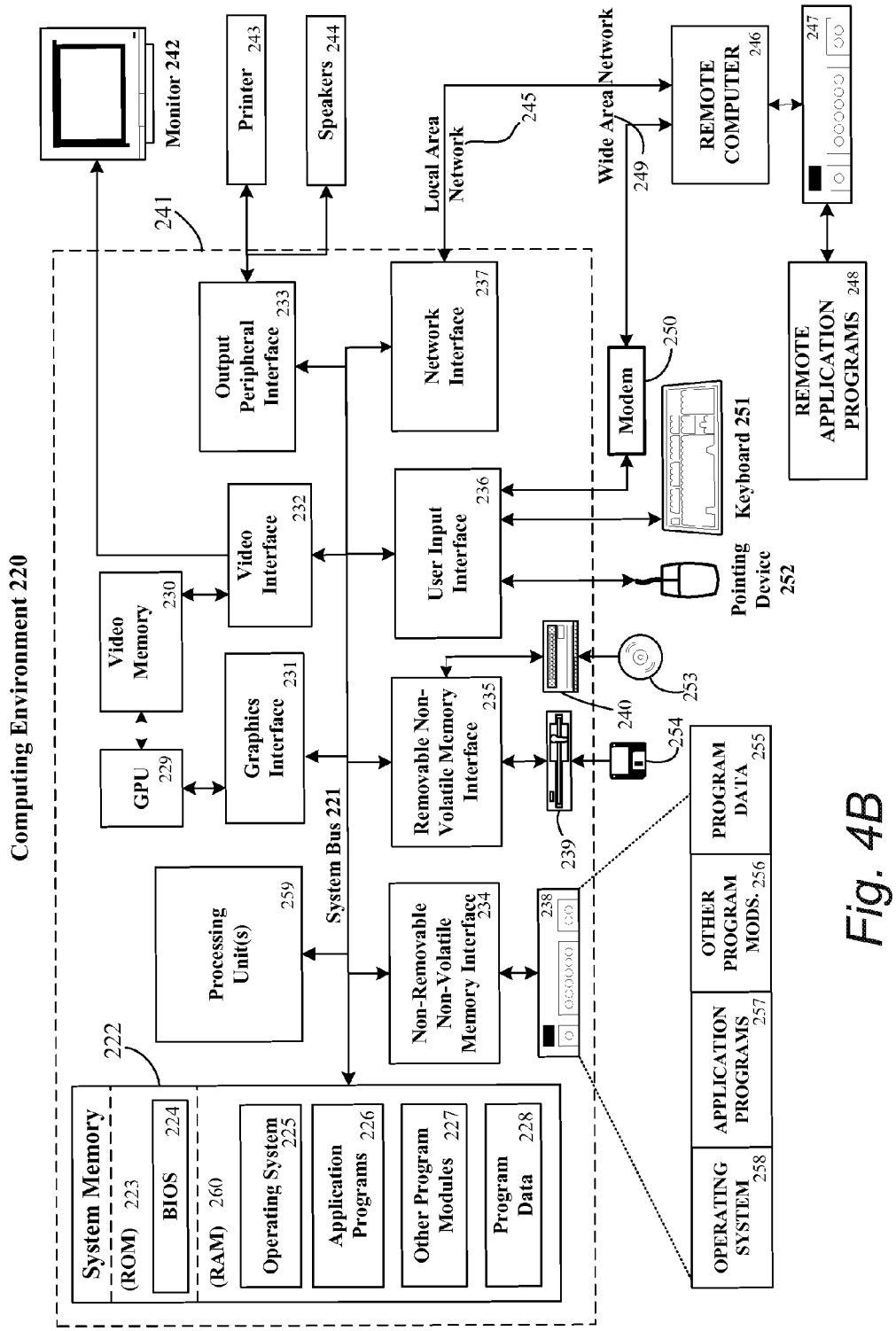
FIG. 4B illustrates another example embodiment of a computing environment that may be used to interpret one or more gestures in a target recognition, analysis, and tracking system.

FIGS. 4A and 4B illustrate two specific examples of computing environments which may exist on systems 10. In one embodiment, the computing environment 12 described above with respect to FIGS. 1A-2 may be a multimedia console 100, such as a gaming console. As shown in FIG. 4A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

FIG. 4B illustrates another example embodiment of a computing environment 220 that may be the computing environment 12 shown in FIGS. 1A-2 used to interpret one or more positions and motions in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4B illustrates operating system 225, application programs 226, other program modules 227, and program data 228. FIG. 4B further includes a graphics processor unit (GPU) 229 having an associated video memory 230 for high speed and high resolution graphics processing and storage. The GPU 229 may be connected to the system bus 221 through a graphics interface 231.

The computer 241 may also include other removable/non-removable, volatile/nonvolatile computer storage media. By way of example only, FIG. 4B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4B, provide storage of computer readable instructions, data structures, program modules and other data for the computer 241. In FIG. 4B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4B. The logical connections depicted in FIG. 4B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4B illustrates remote application programs 248 as residing on memory device 247. It will be appreciated that the network connections shown are exemplary and other means of establishing a communications link between the computers may be used.

Figure 5:
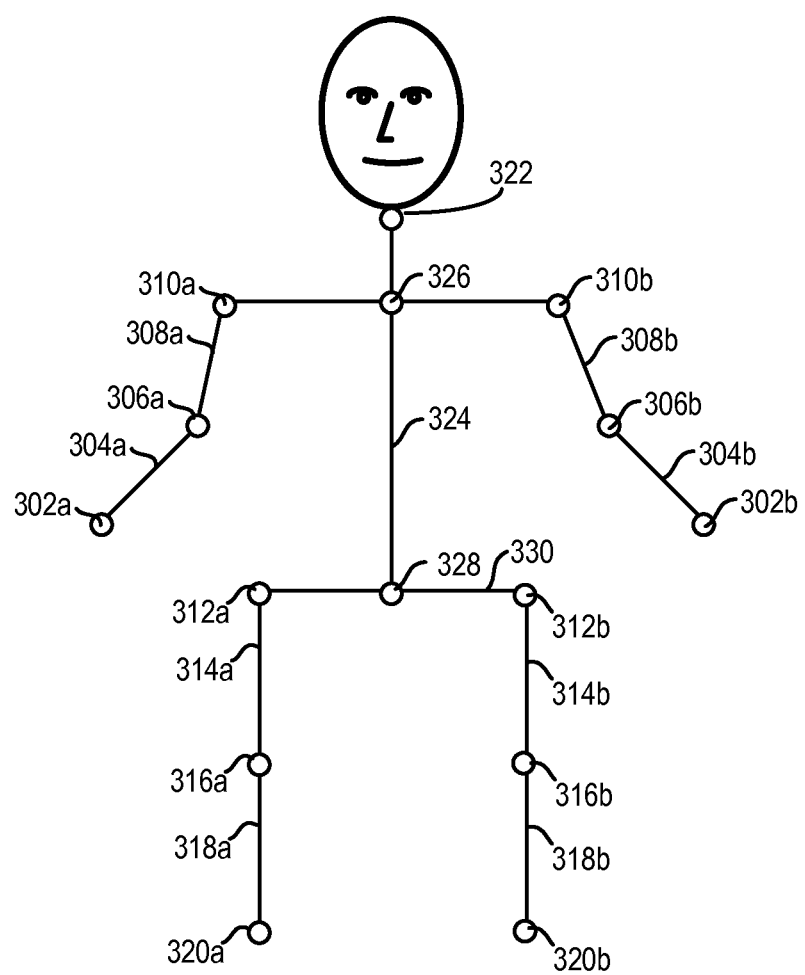
FIG. 5 illustrates a skeletal mapping of a user that has been generated from the target recognition, analysis, and tracking system of FIG. 2.

FIG. 5 depicts an example skeletal mapping of a user that may be generated from the capture device 20. In this embodiment, a variety of joints and bones are identified: each hand 302, each forearm 304, each elbow 306, each bicep 308, each shoulder 310, each hip 312, each thigh 314, each knee 316, each foreleg 318, each foot 320, the head 322, the torso 324, the top 326 and the bottom 328 of the spine, and the waist 330. Where more points are tracked, additional features may be identified, such as the bones and joints of the fingers or toes, or individual features of the face, such as the nose and eyes.

By the capture device 20 obtaining position and/or movement data for different joints, the computing environment is able to compare this data against stored data in order to determine if the user has performed a predefined gesture. Once a predefined gesture is identified, the computing environment then performs the action associated with the predefined gesture. Gesture recognition is performed by the gesture recognition engine 190 as explained hereinafter.

Aspects of the present technology related to PTP 68 will now be explained with reference to FIGS. 6 through 10. FIG. 6 is a high level flowchart illustrating the collection and upload of PTP data. In step 400, a system 10 is launched by a user. In step 402, trait data for the PTP 68 is acquired. The personal trait profile data can be data relating to any trait associated with a user which can be sensed by a sensor which may be included within the system 10. Sensors which have been described above for this purpose include capture device 20 having 3-D camera 26, RGB camera 28 and/or microphone 30. It is understood that other sensors may be included within system 10 for collecting PTP data. One such additional sensor could be an olfactic (smell) sensor.

Given the above definition, PTP data may comprise a wide range of trait information from users, including for example how they look and what they wear, their mannerisms and how they act, any personalized gestures, and how they sound. It is contemplated that other sensed trait data may be included in PTP 68 in further embodiments.

With respect to how a user looks, data for PTP 68 may include the user's size and shape (on a per-body part basis), facial features, head and/or facial hair (style, length and color), any distinct physical characteristics and whether the user is a man or a woman.

With respect to how a user may act, PTP 68 may include data relating to a user's particular body language and/or facial expressions. Such body language data may relate to, for example, a penchant for a user to tap a foot, chew the inside of the cheek, bite fingernails, certain head movements or nervous tics, crack their knuckles, etc. The user may also have certain facial expressions or facial tics which can be sensed and included in a user's PTP 68. PTP 68 may further include whether the user is left or right handed.

Data for PTP 68 may further include how a user performs certain gestures. In particular, a user may have physical limitations or simply learned to perform certain common motions in an atypical manner. For example, Europeans may be used to the game of cricket, where a bowler delivers the ball in a roundhouse motion. If such a user is asked to pitch a ball in an American baseball game, his or her roundhouse delivery may not be recognized as matching a predefined pitching gesture. However, over time, a system may come to recognize that user's motion as a particular gesture, and set up a special rule so that the user's motion is then recognized as that gesture going forward. Alternatively, the user may set up a special definition of a gesture in a special gesture-learning session with the system. In particular, a system 10 may provide the user with an option to perform certain gestures, which are recorded by the system, and then allow the user to associate certain actions with that manually created gesture. In such a session, the user may assign certain atypical motions to one or more predefined gestures and/or a user may assign certain arbitrary motions as one or more predefined gesture shortcuts. All of this data may be stored in a user's PTP 68.

In a similar manner, the system can learn character traits that are not intended as gestures, thereby reducing false positive identification of gestures. For example, if a user is prone to scratch their head (or perform any number of other habits), at times the system may interpret that as a gesture. Over time, the user may indicate that such a motion is not intended as a gesture. The system can learn that and store that information in PTP 68 (i.e., that a particular movement is not a gesture). Thus, when the user thereafter performs that habit, the system understands not to interpret that as a gesture.

In embodiments, data for a user's PTP 68 may further include what the user wears. It may happen that a user is prone to wearing a particular color or type of clothing, either everyday, or once every periodic time period (such as the same day every week). These traits may be sensed by the capture device 20 and computing environment 12, and included in PTP 68.

PTP 68 may include multi-modal data. Thus, in addition to appearance data, PTP 68 may include speech data relating to a user. Such data may include a wide variety of traits relating to speech, such as for example accent, pitch, tenor, cadence and whether the user stutters. Other voice and speech data is contemplated.

The above description of what user traits may be included within PTP 68 is by way of example only, and it will be appreciated that a variety of other traits associated with a particular user may be included within that user's PTP 68 in further embodiments.

Referring again to FIG. 6, trait data for PTP 68 is acquired in step 402. This step may involve an active or passive gathering of PTP information. For example, the system could prompt a user to speak a certain word or phrase, prompt a user to perform a given gesture or have the user perform some other act that then forms part of the user's PTP 68. The system may prompt a user to speak or perform a given gesture exemplifying a particular trait one or more times so that the system may obtain a good baseline for that particular trait. The above described steps for actively gathering information may be performed automatically by the computing environment 12, or a user may indicate to the computing environment 12 that they wish to enter a mode where they record trait information for inclusion in their PTP 68. As an alternative to active trait gathering, the system may passively gather trait data in step 402. That is, the system can gather trait data for the user's PTP 68 as the user engages in normal interaction with the system 10.

While it is possible that data for a particular trait is gathered once and stored in the user's PTP 68, the system 10 may continuously refine stored trait data in PTP 68 over time. Thus, for example, as a user gains or loses weight, grows or shaves a beard or changes their hairstyle, the user's PTP 68 would be updated with new data to reflect the user's current characteristics. Those of skill will appreciate various data structures and fields which may be used to store a PTP 68 in such a way that specific fields may be created, accessed and/or updated.

In step 404 of FIG. 6, the computing environment 12 may store trait data within a version of PTP 68 that is stored locally in memory associated with computing environment 12. This cached version of a user's PTP 68 may be used when a connection to service 52 is unavailable for upload or download of PTP 68 data. Assuming a connection is available to service 52, the trait data may be uploaded to service 52 in step 406 and stored in service database 62 as described above. PTP 68 may be created and/or added to by a user 18 from any system 10 at which the user is located when the system 10 is networked to service 52.

Referring now to the flowchart of FIG. 7, with the present technology, a user 18 may have the ability to access their PTP 68 from any system having a network connection to service 52. A user may alternatively or additionally access a version of PTP 68 from a first system 10 instead of service 52 while located at another system 10. In step 410, the user may launch a system 10 at which they are located. In step 414, the system checks whether the user is properly authenticated using an established authentication protocol. If not authenticated, the user may continue using the system 10 in step 420 but without access to the PTP 68.

Assuming the user is properly authenticated, the system next determines whether a PTP 68 is available in step 424. The system may check with service 52 for a stored PTP. Alternatively or additionally, the system 10 may check whether other systems 10 have an available version of the user's PTP. If no PTP 68 is available in step 424, the system 10 may check whether it has a local cached PTP available in step 428. If a PTP is available from service 52 in steps 424, or a local cached version of PTP is available in step 428, that PTP is loaded in step 432. If there is no available PTP in steps 424 or 428, the system 10 may continue in step 420 without the PTP.

The storing of PTP 68 data in the cloud so that it may be accessible to a user 18 at different systems 10 provides several benefits. First, cloud storage of PTP 68 enhances the user experience in that a user's personalized, atypical and/or idiosyncratic gestures and interactions with a NUI system may be available at any networked system at which the user is located. Thus, each system at which a user is located may be tuned to that user's style and pattern of interaction at the start of the user's session, without the user having to endure failed gesture recognition and/or a learning curve as the system becomes familiar with the user. A user can use any system as if it was their home system. Even when using a system for the first time, that system knows their PTP data and is tuned to that data. Use of PTP 68 may further serve to personalize a user's experience, regardless of which system 10 the user is using.

In addition to the above-described improved user experiences, a cloud-based PTP 68 can be used to aid in user identification and authentication. In particular, the sum total of a user's PTP data, or even portions thereof, may serve to uniquely identify that user from all other users. As such, PTP data can be used as part of and/or in conjunction with any of various authentication protocols so as to authenticate whether a user is in fact who the systems believes the user to be.

Figure 8:
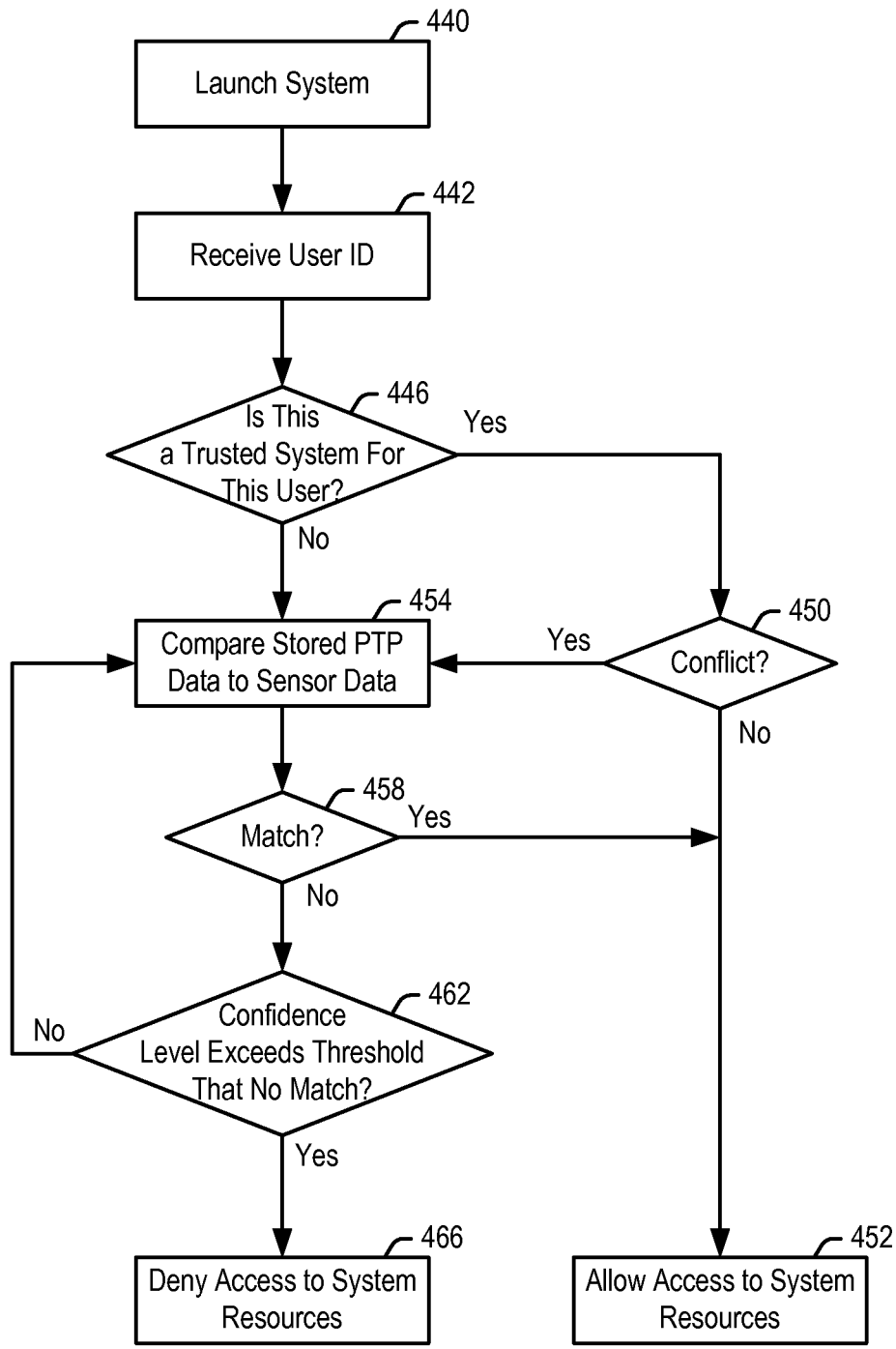
FIG. 8 is a flowchart of a system for authentication using a personal trait profile.
Figure 9:
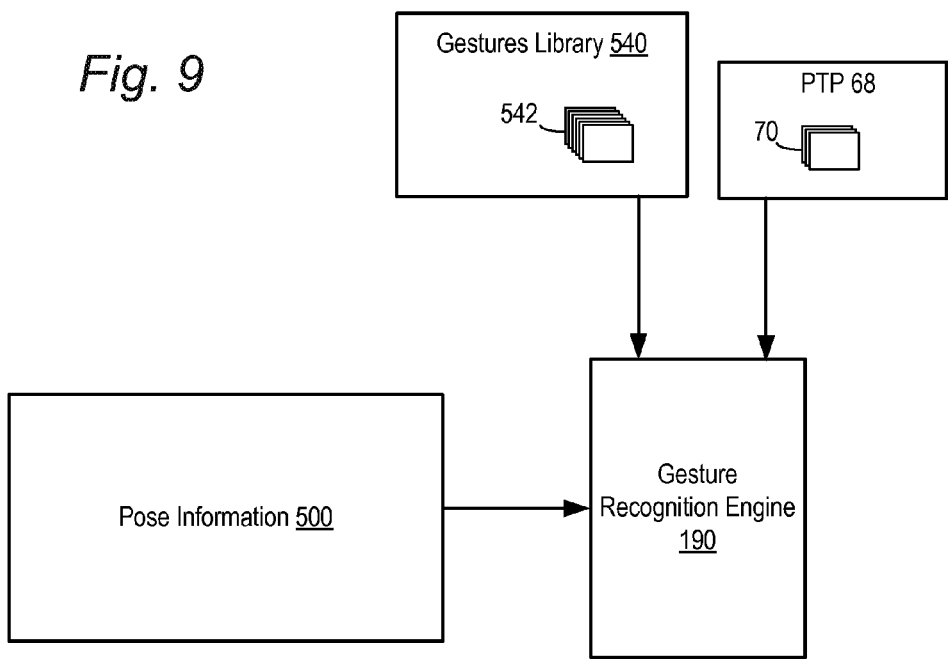
FIG. 9 is a block diagram of a system for recognizing user gestures.
Figure 10:
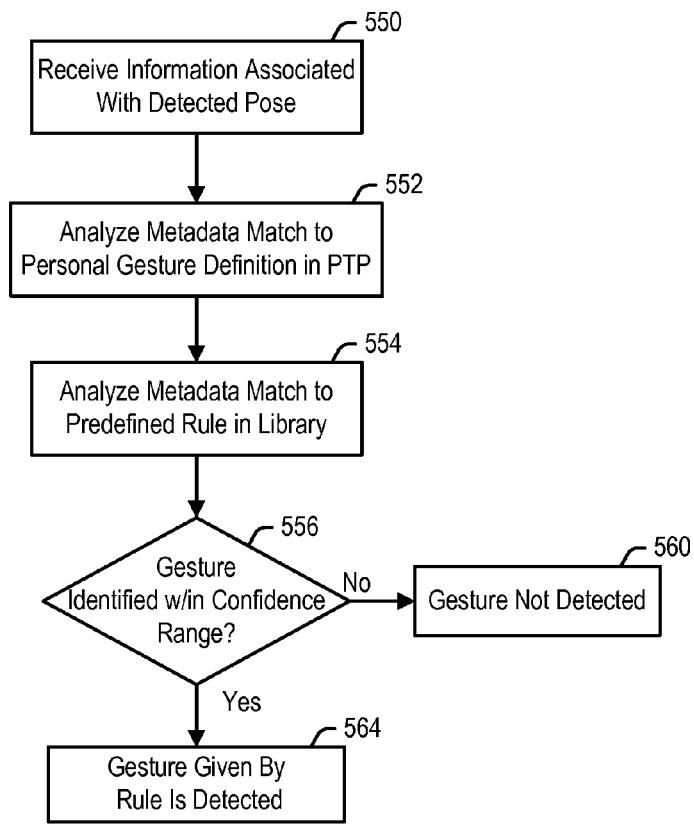
FIG. 10 is a flowchart of the operation of the system for recognizing user gestures shown in FIG. 9.

FIG. 8 shows one example of how a PTP 68 may be incorporated into an authentication protocol for authenticating a user on a system 10. In step 440, a user may launch a system 10 at which the user is located. In step 442, the system 10 may receive a user ID such as a gamer tag or other identification. In step 446, the system 10 or service 52 may determine whether the system at which the user is located is a trusted system for that user. Trusted systems may include systems from which the user frequently connects from (such as a home or work system), a system within a predefined radius of the user's home or work system, and/or a system registered to a friend of the user as indicated by the user's friend list. Those with skill in the art will appreciate other criteria by which a given system may be considered to be or not to be a trusted system for a user.

If the system is a trusted system in step 336, the system may next check whether a conflict exists in step 450. A conflict may exist where for example that same user is shown to be online at another system in another location. A conflict may further exist if the service 52 shows that the user was logged on at another system and could not have gotten from that system to the current system in the time elapsed. Such a conflict is referred to herein as a geo-temporal conflict. If no conflict is detected in step 450, the system may allow access in step 452. If a conflict is found to exist, additional security checks may be required, such as for example prompting the user to perform certain gestures as explained below with respect to step 454.

In the above steps, if the system was a trusted system and there was no conflict, the user is given access to system resources without looking at a user's PTP 68. In further embodiments, step 446 may be skipped. In such an embodiment, the system may look at a user's PTP 68 and compare that to live data received from the current system (as explained below) regardless of whether the user is at a trusted system.

Returning to step 446, if the system is not a trusted system for that user, the system may access stored PTP data and compare that data to live data acquired by the system requesting access to the system resources in step 454. For example, a system may examine PTP data related to the user's physical appearance such as height, weight, facial features, etc., and compare that data against live data obtained by capture device 20 for the user attempting to gain access to the system. In further embodiments, the system may prompt the user to perform certain gestures for which PTP data exists. These gestures may for example be shortcut gestures or other gestures that a user has stored in his or her PTP 68.

If there is a match between the stored and live data in step 458, the system may allow access to the user in step 452. If no match is found in step 458, the system may deny access to its resources to the user in step 466. In order not to lock out legitimate users, the system may check in step 462 if the confidence level as to a non-match exceeds some predefined threshold. If not, the system may return to 454 to obtain and compare additional live trait data against stored PTP data. If on the other hand, the system is clear that there is no match, the system may deny access to the user to system resources in step 466.

In further embodiments, the system may use multiple devices together with PTP data in confirming a user's identification. In one such example, a mobile phone or some other mobile handheld device may be a system 10 with a cached version of PTP 68 data. When a user brings that device within proximity of a second system 10, the systems may communicate with each other and the cached version of the PTP 68 on the mobile device may be compared against the PTP 68 stored locally on the second system 10 or accessed from service 52. If there is a match, the system 10 may consider the user authenticated and allow access to the user.

As noted above, one feature of the present technology is to create and recognize specialized gestures and gesture shortcuts. Those of skill in the art will understand a variety of methods of analyzing acquired parameters to determine whether the parameters conform to a predefined gesture. Such methods are disclosed for example in the above incorporated application Ser. No. 12/475,308, as well as U.S. Patent Publication No. 2009/0074248, entitled "Gesture-Controlled Interfaces For Self-Service Machines And Other Applications," which publication is incorporated by reference herein in its entirety. However, a gesture recognition engine 190 for recognizing gestures according to embodiments of the present technology is explained in greater detail with reference to the block diagram of FIG. 9 and the flowchart of FIG. 10.

The gesture recognition engine 190 receives pose information 500 in step 550. The pose information may include a great many parameters, including the x, y and z minimum and maximum image plane positions detected by the capture device 20 for various joints. The parameters may also include a measurement of the velocity and acceleration for discrete time intervals for various joints. Thus, in embodiments, the gesture recognition engine 190 can receive a full picture of the position and kinetic activity of all points in the user's body.

Predefined gestures may be stored in a gestures library 540 which may be specific to a particular application running on a computing environment 12 or generic to a computing environment 12. The library 540 may be stored locally in a computing environment 12, or remotely on service 52 or on another system 10. Library 540 includes stored rules 542, which describe when particular positions and/or kinetic motions indicated by the pose information 500 are to be interpreted as a predefined gesture. In embodiments, each gesture may have a different, unique rule or set of rules 542. Each rule may have a number of parameters (joint position vectors, maximum/minimum position, change in position, etc.) for one or more of the body parts shown in FIG. 5. A stored rule may define, for each parameter and for each body part 302 through 330 shown in FIG. 5, a single value, a range of values, a maximum value, a minimum value or an indication that a parameter for that body part is not relevant to the determination of the gesture covered by the rule. Rules may be created by a game author, by a host of the gaming platform or by users themselves.

As described above, user 18 may perform certain gestures in an atypical manner which may not ordinarily be identified by a rule 542 in library 540. As such, a user's PTP 68 may store special definitions 70 of gestures that are specific to that user. One such special gesture mentioned above is a roundhouse motion by a cricket player who is playing a baseball game. There are a wide variety of other special gestures and gesture shortcuts which may exist. These special definitions 70 may relate to any gesture that a user may perform in an unusual, atypical and/or arbitrary manner which may not otherwise be identified by a rule 542 in gestures library 540.

The gesture recognition engine 190 analyzes the received pose information 500 in steps 552 and 554 to see if the pose information matches any rule definition 70 in the user's PTP 68, or a predefined rule 542 stored within a gestures library 540. The gesture recognition engine 190 may output both an identified gesture and a confidence level which corresponds to the likelihood that the user's position/movement corresponds to that gesture. In particular, in addition to defining the parameters required for a gesture, a definition 70 and/or rule 542 may further include a threshold confidence level required before pose information 500 is to be interpreted as a gesture. Some gestures may have more impact as system commands or gaming instructions, and as such, require a higher confidence level before a pose is interpreted as that gesture. The comparison of the pose information against the stored parameters for a rule results in a cumulative confidence level as to whether the pose information indicates a gesture.

Once a confidence level has been determined as to whether a given pose or motion satisfies a given gesture definition or rule, the gesture recognition engine 190 then determines in step 556 whether the confidence level is above a predetermined threshold for the rule under consideration. The threshold confidence level may be stored in association with the rule under consideration. If the confidence level is below the threshold, no gesture is detected (step 560) and no action is taken. On the other hand, if the confidence level is above the threshold, the user's motion is determined to satisfy the gesture rule under consideration, and the gesture recognition engine 190 returns the identified gesture. Those of skill in the art will appreciate variations on the above-described steps for detecting predefined gestures in library 540 and/or in a user's PTP 68.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A method of improving a user experience with natural user interface systems, comprising:
   a) acquiring user-specific trait data representing a user-specific trait of a user from a sensor of a natural user interface associated with a first computing environment, acquiring the user-specific trait data comprising the step of acquiring and storing, over time, user-specific data relating to an atypical manner in which the user performs a predefined gesture to refine a stored gestural rule defining how the predefined gesture is performed;
   b) storing the trait data acquired in said step a) in a location accessible to a second computing environment distinct from the first computing environment;
   c) providing the trait data stored in said step b) to the second computing environment;
   d) receiving a first version of the personal trait data stored on the second computing environment by the third computing environment, the third computing environment having access to the personal trait data independently of the second computing environment;
   e) comparing, by the third computing environment, the first version of the personal trait data received from the second computing environment with a second version of the personal trait data received independently of the second computing environment to validate the second computing environment; and
   f) using the stored trait data in the second computing environment to decrease misinterpretation of the user performing the gesture user's gestures performed in interacting with the second computing environment.

2. The method of claim 1, said step b) comprising the step of storing the trait data in a third computing environment accessible to the first and second computing environments.

3. The method of claim 2, said step of storing the trait data in a third computing environment comprising the step of storing the trait data in a central database associated with one or more servers in a server-client network topology, the first and second computing environments comprising clients capable of accessing the central database.

4. The method of claim 1, the capture device comprising a first capture device, the method further comprising the step of adding to the personal trait profile for the user from data representing a trait of the user received from a second capture device associated with the second computing environment.

5. The method of claim 1, further comprising the step of updating data for a trait in the personal trait profile for the user from data representing the trait of the user received from the capture device associated with the first computing environment.

6. The method of claim 1, said step of the third computing environment having access to the personal trait data independently of the second computing environment in said step c) comprising the step of storing the personal trait profile in at least one of: (i) a central database accessible to the third computing environment via a client-server network topology; and (ii) the third computing environment.

7. The method of claim 1, further comprising the step of the third computing environment using the trait data to improve a performance of the third computing environment in interpreting the user's gestures with the third computing environment.

8. A method of improving a user experience with natural user interface systems, comprising:
   a) acquiring data representing a trait of a user from a sensor of a natural user interface associated with a first computing environment, acquiring the trait data comprising the step of acquiring and storing, over time, user-specific data relating to an atypical manner in which the user performs a predefined gesture to refine a stored gestural rule defining user movements and/or positions that comprise the predefined gesture;
   b) storing the trait data acquired in said step a) in a second, mobile computing environment distinct from the first computing environment;
   c) pairing the second, mobile computing environment with a third computing environment distinct from the second, mobile computing environment when the second and third computing environments are proximate to each other, the second, mobile computing environment transmitting the trait data stored on the second, mobile computing environment to the third computing environment upon said pairing; and
   d) comparing the trait data received from the second, mobile computing environment in said step c) against trait data for the user stored in the third computing environment; and
   e) allowing or disallowing the user access to resources on the third computing environment depending on results of the comparison performed in said step d).

9. The method of claim 8, said step a) of acquiring data representing a trait of a user comprising the step of generating a personal trait profile from data representing least one of the user's physical characteristics, the user's voice and gestures performed by the user.

10. The method of claim 8, further comprising the step of the third computing environment using the trait data received from the second computing environment to improve a performance of the third computing environment in interpreting the user's gestures with the third computing environment.

\* \* \* \* \*